United States Patent Office 3,657,281
Patented Apr. 18, 1972

3,657,281
4-ARYL-1-DIBENZOFURAN-ALKANOIC ACIDS AND SALTS THEREOF
Franklin W. Short, Saline, Mich., assignor to Parke, Davis & Company, Detroit, Mich.
No Drawing. Filed Dec. 31, 1969, Ser. No. 889,744
Int. Cl. C07d 5/44
U.S. Cl. 260—346.2     3 Claims

ABSTRACT OF THE DISCLOSURE 4-phenyl-1-dibenzofuranacetic acid, 4-(o-fluorophenyl)-1-dibenzofuranacetic acid, 4-(o-chlorophenyl)-1-dibenzofuranacetic acid, α-methyl derivatives, and carboxylate salts. The compounds are anti-inflammatory agents useful in relieving or preventing inflammation. They can be produced from the corresponding α-cyano lower alkyl esters by hydrolysis and accompanying decarboxylation of one of the two resulting carboxyl or carboxylate groups.

SUMMARY AND DETAILED DESCRIPTION

The present invention relates to new polycyclic compounds. More particularly, the invention relates to certain 4-aryl-1-dibenzofuranalkanoic acids, to salts thereof, and to methods for the production of the foregoing compounds. In the form of the free carboxylic acids, the compounds of the invention can be represented by the formula

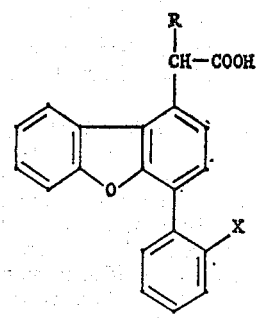

In this formula, R represents hydrogen or methyl; and X represents hydrogen, fluorine, or chlorine.

In accordance with the invention, the compounds of the foregoing formula and their salts can be produced by reacting a compound of the formula

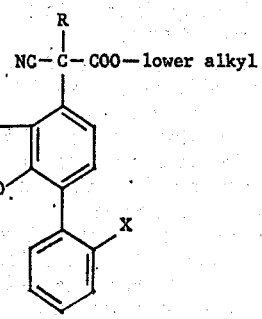

with a hydrolytic agent; where R and X are as defined before. The lower alkyl group preferably contains not more than 6 carbon atoms and can be either substituted or unsubstituted. The hydrolytic agent is water or an aqueous medium containing a base or an acid. Some examples of suitable bases are alkali metal hydroxides, alkaline earth metal hydroxides, alkali metal alkoxides, and trialkylammonium hydroxides. A preferred base is sodium hydroxide or potassium hydroxide. Some examples of suitable acids are mineral acids and strong organic acids such as benzenesulfonic acid. A solvent, in addition to water, can be and usually is present. Some examples of suitable solvents are lower alkanols, dioxane, tetrahydrofuran, ethylene glycol, propylene glycol, and diethylene glycol dimethyl ether. A preferred solvent is aqueous ethanol. A considerable excess of the hydrolytic agent is normally used. The time and temperature of the reaction are not particularly critical. In general, the reaction is carried out at a temperature from about 50 to 150° C. or the reflux temperature of the solvent for from 1 to 72 hours, with the longer times being used at the lower temperatures. The reaction proceeds by causing hydrolysis of the ester group and also by causing hydrolysis of the cyano group to a carboxyl group or carboxylate salt group. The resulting intermediate product with two carboxyl or carboxylate salt groups then undergoes decarboxylation (loss of carbon dioxide) of one of those groups under the conditions of the reaction. According to the preferred method of carrying out the process, the hydrolysis reaction is carried out under basic conditions at 65–85° C. for from 16 to 30 hours and the product is isolated following acidification. Decarboxylation is facilitated by acidifying the reaction mixture prior to isolation of the product. The product is then isolated either as the free carboxylic acid or as a carboxylate salt by adjustment of the pH as necessary. The products in which R represents methyl can also be obtained in either racemic, or, by resolution, optically-active d- and l- forms.

Starting materials required for use in the foregoing process can be prepared by any of a variety of methods, as illustrated in greater detail hereinafter. For example, a 1-aryl-2-propanone of the formula

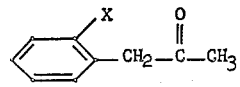

in which X is as defined before, is reacted with sodium and acrylonitrile to produce a 4-aryl-5-oxohexanonitrile, which is reacted with an anhydrous lower alkanol in the presence of hydrogen chloride to produce a 4-aryl-5-oxohexanoic acid, lower alkyl ester. The latter compound is reacted with sodium in anhydrous methanol to produce a 4-arylcyclohexane-1,3-dione, and that product is reacted with 2-chlorocyclohexanone in the presence of potassium hydroxide in aqueous methanol to produce a 4-aryl-3,4,6,7,8,9-hexahydro-1(2H)-dibenzofuranone. That compound is reacted with a lower alkyl cyanoacetate such as ethyl cyanoacetate in the presence of acetic acid and ammonium acetate in benzene solution to produce an α-cyano-4-aryl-1,2,3,4,6,7,8,9-octahydro-$\Delta^{1,\alpha}$-dibenzofuranacetic acid, lower alkyl ester, which is then converted to an α-cyano-4-aryl-1-dibenzofuranacetic acid, lower alkyl ester, by heating with powdered sulfur and then stirring with Raney nickel in benzene. Other starting materials useful in the process according to the invention can be prepared by reacting the α-cyano-4-aryl-1-dibenzofuranacetic acid, lower alkyl ester, with methyl iodide in the presence of sodium hydride in dry tetrahydrofuran to produce an α-cyano-4-aryl-α-methyl-1-dibenzofuranacetic acid, lower alkyl ester. In the foregoing reaction sequences, the aryl group corresponds to the formula

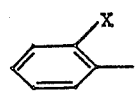

in which X is as defined before.

The free carboxylic acids of the invention form carboxylate salts with any of a variety of inorganic and organic bases. Pharmaceutically-acceptable salts are formed with such bases as sodium hydroxide, potassium hydroxide, calcium hydroxide, sodium carbonate, potassium bicarbonate, ammonia, diethylamine, 2-hydroxyethylamine, and choline. Pharmaceutically-acceptable magnesium and aluminum salts are formed by reacting the sodium salt or other soluble carboxylate salts with magnesium chloride or aluminum chloride in aqueous medium. The preferred carboxylate salts of the invention are the pharmaceutically-acceptable salts of an alkali metal, an alkaline earth metal, aluminum, ammonia, or a substituted ammonia. The carboxylic acids and their salts are interconvertible by adjustment of the pH. They differ in solubility properties but are otherwise equivalent for the purposes of the invention.

The compounds of the invention are new chemical compounds of value as pharmacological agents and as chemical intermediates. They are anti-inflammatory agents useful in the relief of inflammatory conditions as well as in the prevention or suppression of the occurrence of inflammation. Their activity can be demonstrated and measured in a standard laboratory test using depilated guinea pigs. In this test procedure animals are given a selected dose of a test compound and these treated animals and untreated controls are subjected to an exposure of ultraviolet radiation sufficient to cause erythema in the untreated animals. An effective dose of an active compound produces a statistically significant degree of protection against the development of erythema. In this test, 4-phenyl-1-dibenzofuranacetic acid was rated active at an oral dose of 3.1 mg./kg. The compounds are preferably administered by the oral route although parenteral administration can also be used.

The invention is illustrated by the following examples.

EXAMPLE 1

A solution of 14.7 g. of α-cyano-4-phenyl-1-dibenzofuranacetic acid, ethyl ester, and 6.5 g. of 50% aqueous sodium hydroxide in 300 ml. of ethanol is heated at reflux for 24 hours and evaporated to dryness under reduced pressure. The residue is dissolved in water and the solution is washed with ether. The aqueous phase is acidified with hydrochloric acid and the mixture is extracted with ether. This ether extract is washed with water, dried, and evaporated to give a residue of 4-phenyl-1-dibenzofuranacetic acid. For purification, the product is dissolved in benzene and the solution poured on a chromatography column prepared with 500 g. of silica gel. The column is eluted with 5% ether in benzene and with 10% ether in benzene. The fractions containing the product are combined and evaporated. The residue is crystallized from aqueous ethanol to give the purified product; M.P. 153–155° C. The sodium salt is obtained by dissolving equimolar amount of this product and sodium hydroxide in water and evaporating the solution to dryness. The potassium, ammonium, 2-hydroxyethylamine, and choline salts are obtained similarly from potassium hydroxide, ammonia, 2-hydroxyethylamine, and choline.

EXAMPLE 2

By substituting a different ester, as indicated, in the general procedure of Example 1, the following additional products are obtained.

From 14.8 g. of α-cyano-α-methyl-4-phenyl-1-dibenzofuranacetic acid, ethyl ester, the product is α-methyl-4-phenyl-1-dibenzofuranacetic acid.

From 14.9 g. of α-cyano-4-(o-fluorophenyl)-1-dibenzofuranacetic acid, ethyl ester, the product is 4-(o-fluorophenyl)-1-dibenzofuranacetic acid.

From 16.1 g. of 4-(o-chlorophenyl)-α-cyano-1-dibenzofuranacetic acid, ethyl ester, the product is 4-(o-chlorophenyl)-1-dibenzofuranacetic acid.

From 15.5 g. of α-cyano-4-(o-fluorophenyl)-α-methyl-1-dibenzofuranacetic acid, ethyl ester, the product is 4-(o-fluorophenyl)-α-methyl-1-dibenzofuranacetic acid.

Each of the above products is converted to its sodium, potassium, ammonium, 2-hydroxyethylamine, and choline salt by reaction with sodium hydroxide, potassium hydroxide, ammonia, 2-hydroxyethylamine, and choline respectively.

Starting materials

A mixture of 276 mg. of sodium and 68 g. of (o-fluorophenyl)-2-propanone is stirred and heated at 95° C. until the sodium melts and dissolves. The mixture is cooled to 80° C. and then 15.9 g. of acrylonitrile is added dropwise with stirring over a 15 minute period. The mixture is stirred an additional 15 minutes, cooled, and neutralized with 2 ml. acetic acid. This mixture is extracted with ether. The ether extract is washed with water, dried, and evaporated and the residue is fractionally distilled under reduced pressure to give a forerun of unreacted (o-fluorophenyl) - 2 - propanone followed by the desired product 4 - (o-fluorophenyl) - 5 - oxohexanonitrile. 4-(o-chlorophenyl)-5-oxohexanonitrile is prepared similarly from (o-chlorophenyl)-2-propanone.

A solution of 40 g. of 4-(o-fluorophenyl)-5-oxohexanonitrile and 72 g. of hydrogen chloride in 200 ml. of anhydrous methanol is stirred and heated at reflux for 2 hours and then allowed to stand at room temperature for 16 hours. The resulting mixture is cooled to 0–5° C., diluted with 500 ml. of water and extracted with ether. The ether extract is washed with water, with aqueous sodium bicarbonate, and then with saturated aqueous sodium chloride. The ether extract is then dried and evaporated to give a residue of 4-(o-fluorophenyl) 5-oxohexanoic acid, methyl ester. The product is purified by distillation in vacuo. 4-(o-chlorophenyl)-5-oxohexanoic acid, methyl ester, is prepared similarly from 4-(o-chlorophenyl)-5-oxohexanonitrile.

A solution of sodium methoxide is prepared from 8.45 g. of sodium and 137 ml. of anhydrous methanol and to it is added 83.6 g. of 4-(o-fluorophenyl)-5-oxohexanoic acid, methyl ester. The reaction mixture is stirred and heated at reflux for 2 hours and is then cooled and treated with 26 ml. of acetic acid. The mixture is evaporated at reduced pressure and the residue is partitioned between water and ether. The ether phase is separated and the aqueous phase is extracted with several portions of ether. The ether fractions are combined and extracted with dilute aqueous sodium hydroxide. The alkaline extract is acidified with dilute sulfuric acid and extracted with ether. This ether extract is washed with water, dried, and evaporated to give a residue of 4-(o-fluorophenyl)cyclohexane-1,3 - dione. 4-(o-chlorophenyl)-cyclohexane-1,3-dione is prepared similarly from 4-(o-chlorophenyl)-5-oxohexanoic acid, methyl ester.

A solution of 18.8 g. of 2-chlorocyclohexanone in 100 ml. of methanol is added to a solution of 27.0 g. of 4-(o-fluorophenyl)cyclohexane - 1,3 - dione and 7.35 g. of potassium hydroxide in 50 ml. of water. The mixture is stirred and heated at reflux for 3 hours and then evaporated to dryness under reduced pressure. The residue is extracted with benzene and the benzene extract is washed with dilute aqueous sodium hydroxide and with water, dried, and evaporated under reduced pressure to give crude 4 - (o-fluorophenyl)-3,4,6,7,8,9-hexahydro-1(2H)-dibenzofuranone containing an isomeric by-product. The product is obtained in purified form by fractional crystallization. 4 - (o-chlorophenyl) - 3,4,6,7,8,9-hexahydro-1(2H)-dibenzofuranone is prepared similarly from 4-(o-chlorophenyl)cyclohexane-1,3-dione.

A stirred mixture of 24.3 g. of 3,4,6,7,8,9-hexahydro-4-phenyl-1(2H)-dibenzofuranone, 22.6 g. of ethyl cyanoacetate, 22.6 g. of acetic acid, and 2.0 g. of ammonium acetate in 350 ml. of benzene is heated at reflux for 3 days with continuous removal of the water formed in the reaction. The resulting benzene solution is evaporated under reduced pressure to give α-cyano-1,2,3,4,6,7,8,9-octahydro - 4 - phenyl-$\Delta^{1,\alpha}$-dibenzofuranacetic acid, ethyl ester; M.P. 132.5–134.5° C. following trituration with ether and crystallization from ethanol-cyclohexane. α-Cyano-4-(o-fluorophenyl - 1,2,3,4,6,7,8,9 - octahydro-$\Delta^{1,\alpha}$-dibenzofuranacetic acid, ethyl ester, is prepared similarly from 4 - (o-fluorophenyl) - 3,4,6,7,8,9 - hexahydro-1(2H)-dibenzofuranone. α-Cyano - 4 - (o-chlorophenyl)-1,2,3,4,6,7,8,9 - octahydro - $\Delta^{1,\alpha}$ - dibenzofuranacetic acid, ethyl ester, is prepared similarly from 4 - (o-chlorophenyl)-3,4,6,7,8,9 - hexahydro-1(2H)-dibenzofuranone.

A stirred mixture of 15.0 g. of α-cyano-1,2,3,4,6,7,8,9-octahydro - 4 - phenyl - $\Delta^{1,\alpha}$ - dibenzofuranacetic acid, ethyl ester, and 4.2 g. of powdered sulfur is heated slowly to 225° C., held at this temperature for one hour, and then cooled to 25° C. The residual oily product is dissolved in 100 ml. of benzene and the solution is stirred with 5 g. of Raney nickel for 16 hours and filtered. The filtrate is evaporated to give α-cyano-4-phenyl-1-dibenzofuranacetic acid, ethyl ester, as an oil suitable for use without further purification. α-Cyano-4-(o-fluorophenyl)-1-dibenzofuranacetic acid, ethyl ester, is prepared similarly from α-cyano-4-(o-fluorophenyl)-1,2,3,4,6,7,8,9-octahydro-$\Delta^{1,\alpha}$-dibenzofuranacetic acid, ethyl ester. α-Cyano-4 - (o-chlorophenyl) - 1 - dibenzofuranacetic acid, ethyl ester, is prepared similarly from α-cyano-4-(o-chlorophenyl) - 1,2,3,4,6,7,8,9 - octahydro - $\Delta^{1,\alpha}$-dibenzofuranacetic acid, ethyl ester.

A suspension of sodium hydride (from 1.50 g. of a 50% dispersion in mineral oil, washed with petroleum ether) in 25 ml. of dry tetrahydrofuran is treated with a solution of 10.6 g. of α-cyano-4-phenyl-1-dibenzofuranacetic acid, ethyl ester, in 40 ml. of tetrahydrofuran added over a 20 minute period. The resulting solution is stirred at 20–25° C. for 2 hours. A solution of 5.0 g. of methyl iodide in 10 ml. of tetrahydrofuran is then added and the mixture is heated at reflux for 3 hours. It is then cooled, poured into dilute hydrochloric acid, and extracted with ether. The ether extract is washed with several portions of 2 N aqueous sodium hydroxide and with saturated aqueous sodium chloride, dried, and evaporated to give an oily residue of α-cyano-α-methyl-4-phenyl-1-dibenzofuranacetic acid, ethyl ester, suitable for use without further purification. α-cyano-4-(o-fluorophenyl)-α-methyl-1-dibenzofuranacetic acid; ethyl ester, is prepared similarly from α - cyano - 4 - (o - fluorophenyl) - 1 - dibenzofuranacetic acid, ethyl ester.

I claim:
1. A member of the class consisting of compound of the formula

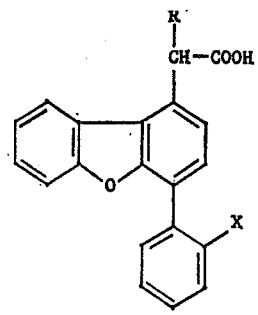

and pharmaceutically-acceptable carboxylate salts thereof; where R is a member of the class consisting of hydrogen and methyl, and X is a member of the class consisting of hydrogen, fluorine, and chlorine.

2. A compound according to claim 1 which is 4-phenyl-1-dibenzofuranacetic acid.

3. A compound according to claim 1 which is 4-(o-fluorophenyl)-1-dibenzofuranacetic acid.

References Cited

Synthetic Organic Chem., by Romeo Wagner et al., John Wiley, New York (1953) p. 429.

ALEX MAZEL, Primary Examiner

B. I. DENTZ, Assistant Examiner

U.S. Cl. X.R.

260—465, 476, 586; 424—285